April 20, 1926.

M. HANDSCHIEGL 1,581,342

COLOR TRANSFER MACHINE

Filed June 19, 1923

INVENTOR:
Max Handschiegl,
BY
Graham + Lamin
ATTORNEYS.

April 20, 1926.

M. HANDSCHIEGL 1,581,342

COLOR TRANSFER MACHINE

Filed June 19, 1923

INVENTOR:
MAX HANDSCHIEGL,
BY
Graham + Lewis
ATTORNEYS.

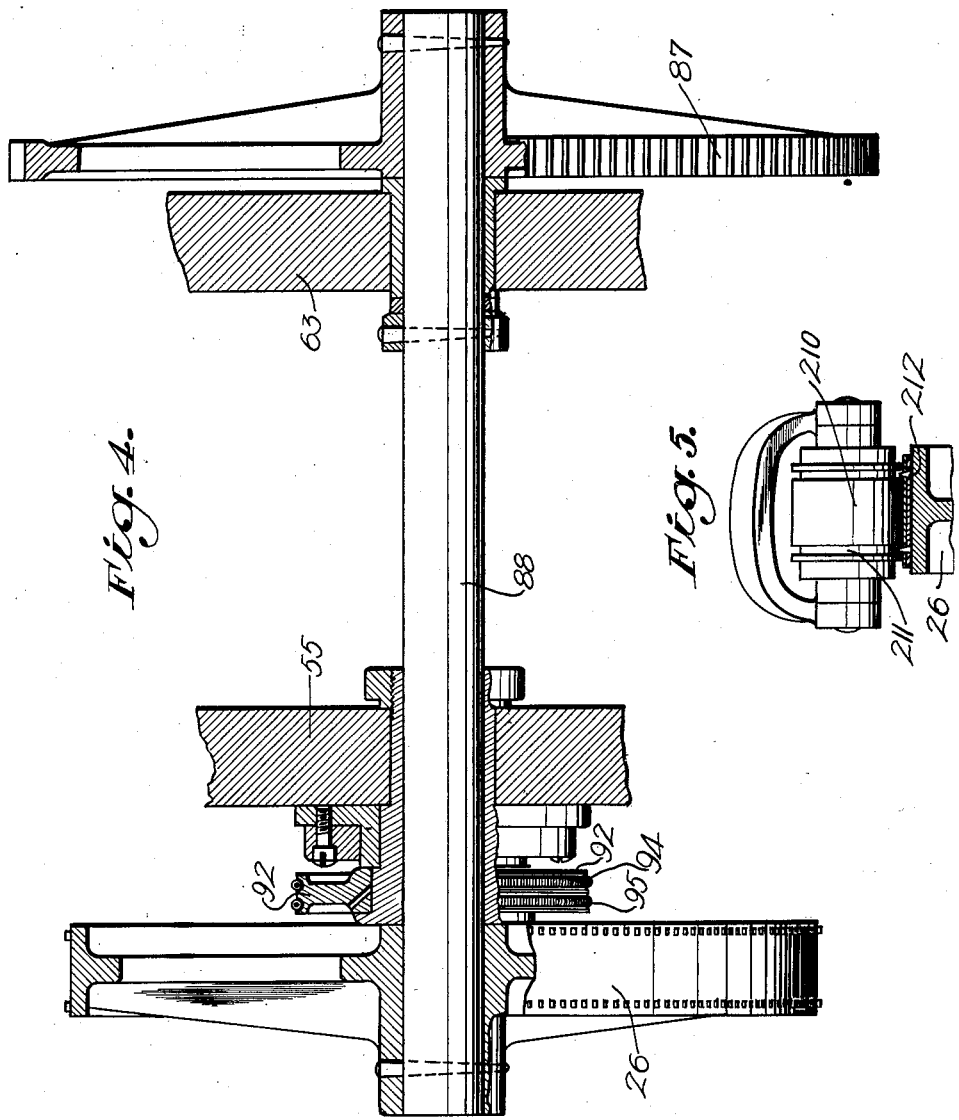

April 20, 1926. 1,581,342
M. HANDSCHIEGL
COLOR TRANSFER MACHINE
Filed June 19, 1923 8 Sheets-Sheet 5
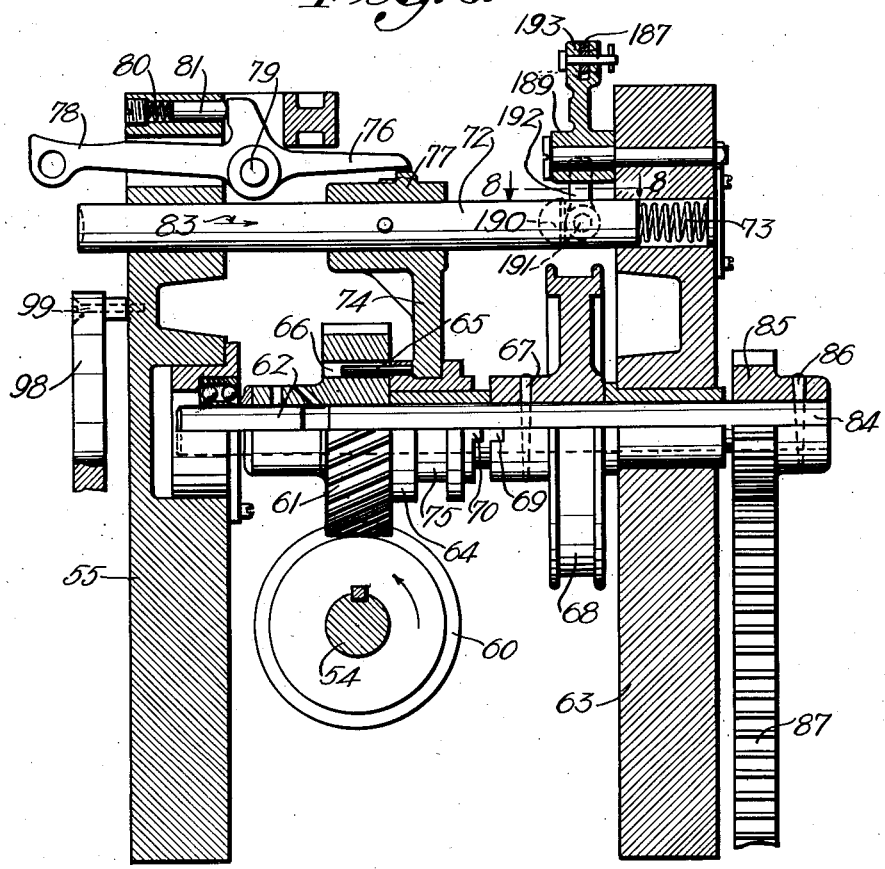
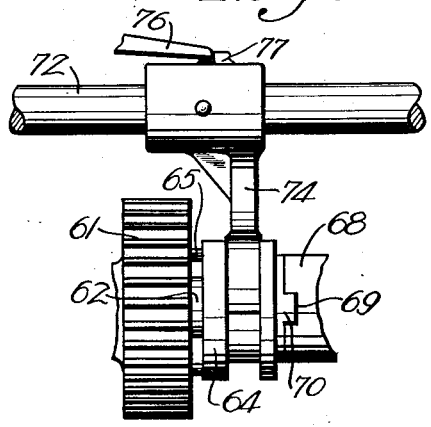
INVENTOR:
MAX HANDSCHIEGL,
BY
Graham + Harris
ATTORNEYS.

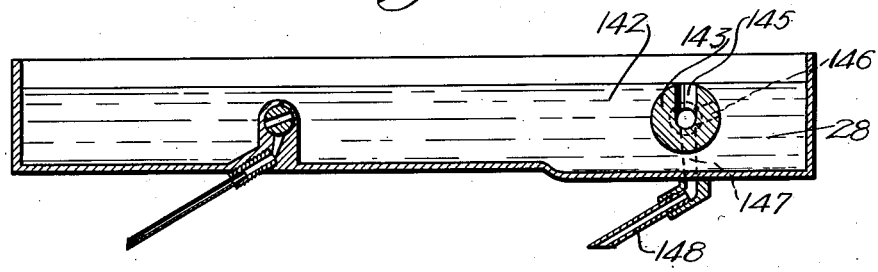
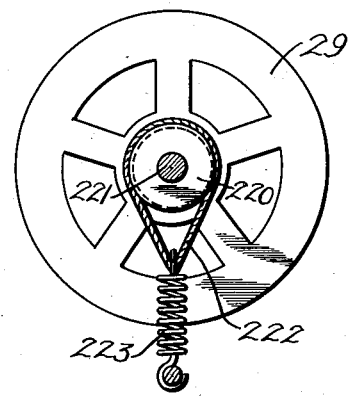
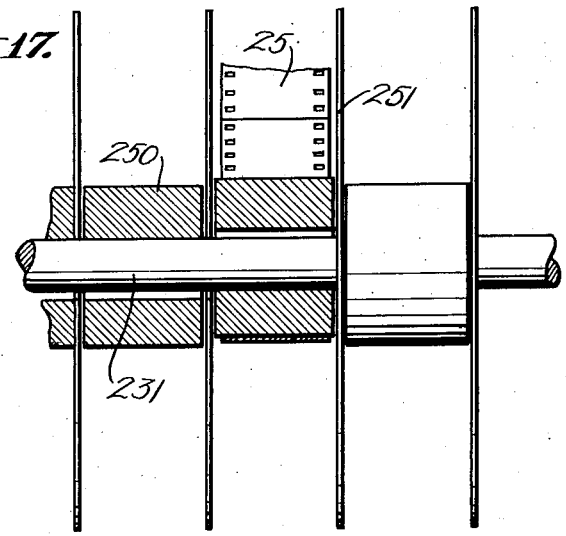
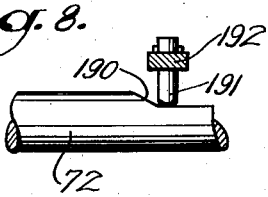

April 20, 1926.
M. HANDSCHIEGL
1,581,342
COLOR TRANSFER MACHINE
Filed June 19, 1923
8 Sheets-Sheet 7
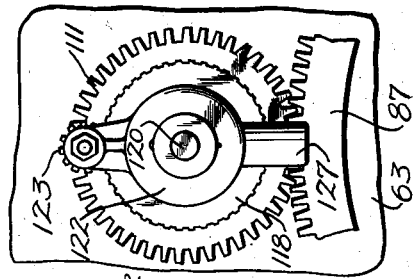
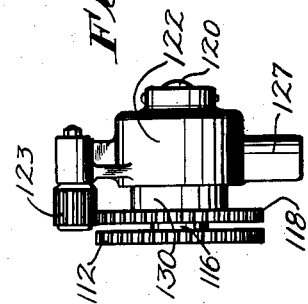
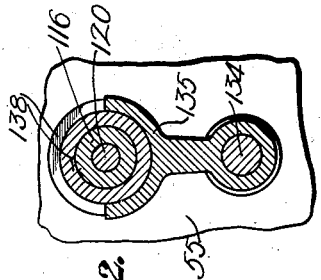
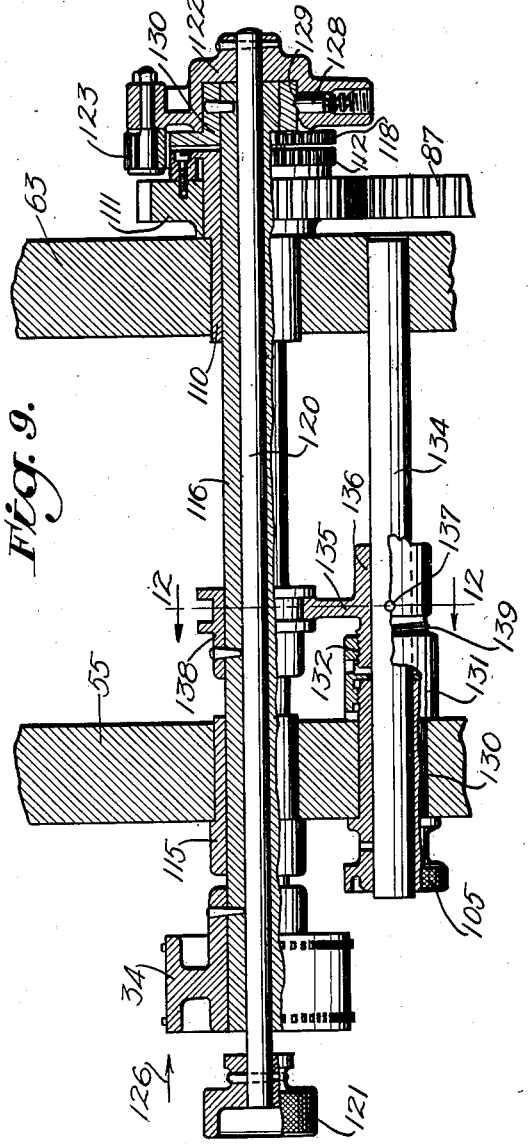
INVENTOR:
MAX HANDSCHIEGL,
BY
Graham + Davis
ATTORNEYS.

April 20, 1926.
M. HANDSCHIEGL
1,581,342
COLOR TRANSFER MACHINE
Filed June 19, 1923
8 Sheets-Sheet 8
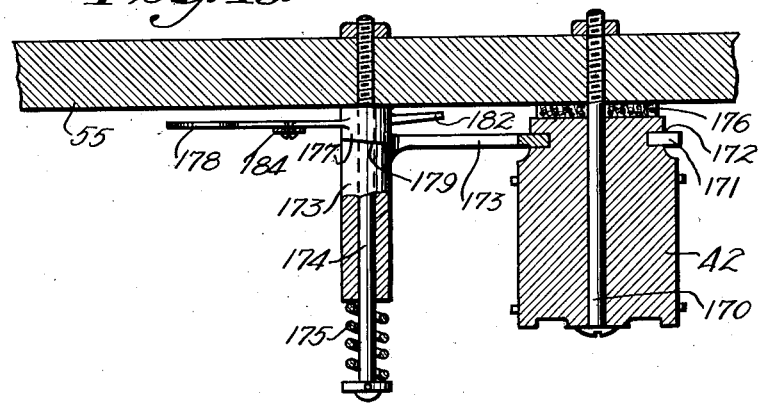
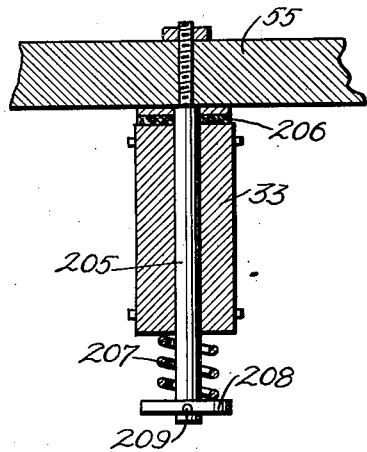
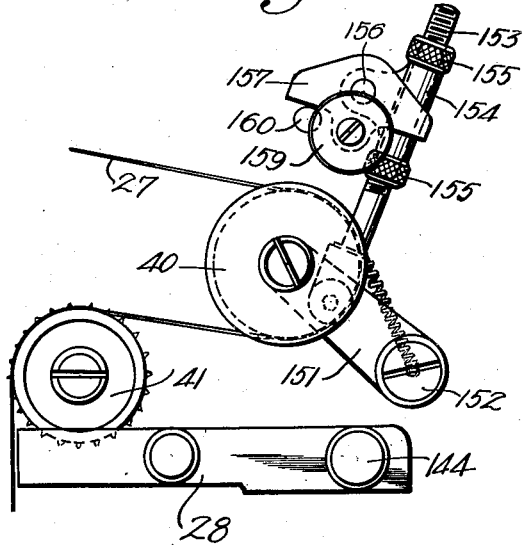
INVENTOR:
MAX HANDSCHIEGL,
BY
ATTORNEYS.

Patented Apr. 20, 1926.

1,581,342

UNITED STATES PATENT OFFICE.

MAX HANDSCHIEGL, OF LOS ANGELES, CALIFORNIA.

COLOR-TRANSFER MACHINE.

Application filed June 19, 1923. Serial No. 646,378.

*To all whom it may concern:*

Be it known that I, MAX HANDSCHIEGL, a citizen of the United States, residing at Los Angeles, in the county of Los Angeles, State of California, have invented a new and useful Color-Transfer Machine, of which the following is a specification.

This invention relates to the art of coloring motion pictures..

In this art various colors are applied to the positive film which is employed for projection of the motion picture upon the screen, the projecting light which passes through the colored portions of the film being colored thereby so that the colors which have been applied to the film appear upon the screen.

The invention is employed with a film coloring process in which color printing plates are formed upon separate strips of film, these printing plates being impregnated with dye and brought into registered contact with the positive films, so that the dye carried on the printing plate is transferred to the positive. The printing plates may be formed in various manners which constitute no part of this invention. In the transfer of color from a printing plate to a positive, it is necessary that the positive plate may also be moistened, but this is not entirely necessary to the efficient transfer of color.

It is an object of the invention to provide a color transfer machine in which the positive film to be printed is brought into registered contact with the color printing plate and to provide therewith an improved means for applying moisture to the positive film previous to its contact with the color printing plate.

It is a further object of the invention to provide a color transfer machine in which the films are fed to the color transfer drum by sprockets which are driven in peripheral synchronism with the drum, thus enabling the films to be placed upon the drum in superimposed and correctly registered relationship.

It is a further object of the invention to provide an improved means for adjusting the feed sprockets in relationship to the color transfer drum.

It is a further object of the invention to provide a film takeoff sprocket which may be moved in an arc of contact between the positive film and the color printing plate and whose contact may be varied in order to accomplish the transfer of the correct amount of color.

It is a further object of the invention to provide a retarding means for taking the slack out of the films as they are fed to the feed sprockets and it is a still further object to provide an improved form of friction release for certain of the retarded sprockets over which a film is passed in order to allow these sprockets to rotate freely while the film is being initially placed thereover.

It is a further object of the invention to provide a simple form of adjustment for aligning these feed sprockets with the color transfer drum.

The especial advantages of the invention and further objects thereof will be made evident hereinafter.

Referring to the drawings which are for illustrative purposes only,

Fig. 4 is an enlarged fragmentary section taken substantially upon a plane represented by the line 4—4 of Fig. 3.

Fig. 5 is a fragmentary section to enlarged scale taken upon a plane indicated by the line 5—5 of Fig. 3.

Fig. 6 is an enlarged detailed section taken upon a plane represented by the line 6—6 of Fig. 3.

Fig. 7 is a fragmentary view to be considered in co-operation with Fig. 6 for the purpose of illustrating a clutch engagement and clutch latch mechanism.

Fig. 8 is a fragmentary section taken on a plane represented by the line 8—8 of Fig. 6.

Fig. 9 is an enlarged detailed section taken upon a plane represented by the line 9—9 of Fig. 3 for the purpose of showing the improved feed sprocket adjustment.

Fig. 10 is an end elevation of Fig. 9.

Fig. 11 is a fragmentary view showing the differential gears in released arrangement.

Fig. 12 is a fragmentary section taken upon a plane represented by the line 12—12 of Fig. 9.

Fig. 13 is a slightly enlarged fragmentary section taken upon a plane represented by the line 13—13 of Fig. 3.

Fig. 14 is an enlarged section through the film moistening tray showing the method of controlling the level of liquid therein and the feeding of liquid to the film after it has been removed from the moistening trough.

Fig. 15 is a fragmentary view showing the film immersing spool in raised position.

Fig. 16 is a fragmentary section taken upon a plane represented by the line 16—16 of Fig. 3, for the purpose of showing the manner of frictionally engaging the film sprocket so as to retard the movement of the film and to keep it taut upon the feed sprocket.

Fig. 17 is an enlarged, fragmentary view partially in section, showing the construction of the film drying spools.

Fig. 18 is a fragmentary partially sectioned view, showing the brake arrangement employed to control the rotation of the film reel from which the color printing plate is carried into the machine.

Figure 1:
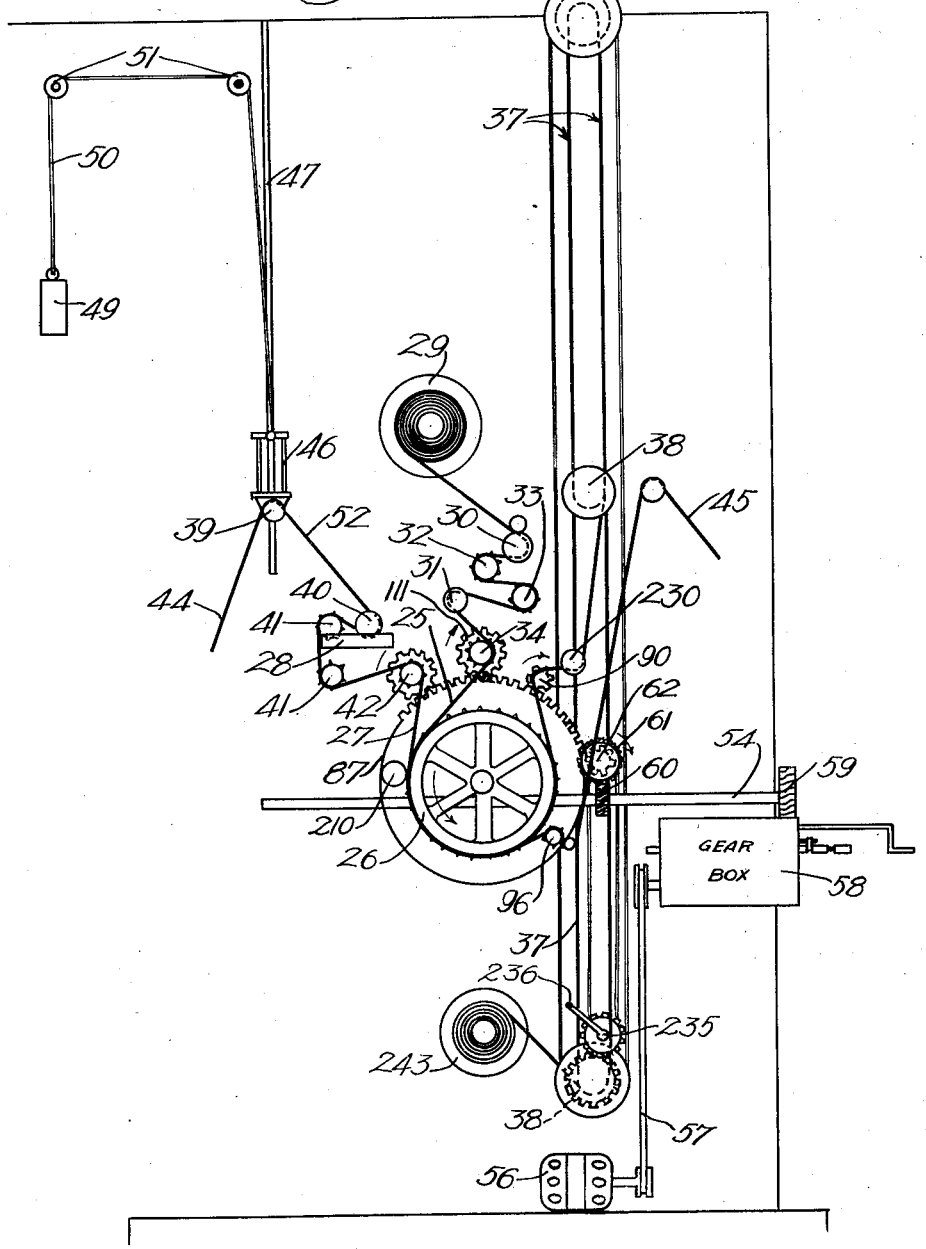
Fig. 1 is a diagrammatic elevation showing the general arrangement and path of the films in a preferred embodiment of the invention.

As indicated in Fig. 1 of the drawing, it is preferable to first conduct the color printing plate 25 which constitutes a strip of film carrying a transferable dye over a color transfer drum 26 and to superimpose the positive film 27 upon the film 25. The reason for this will become evident in the following explanation.

Where strips of film or any other material are placed upon a drum in superimposed relationship, the arc of curvature of the outer film is greater than that of the inner film; therefore, between any two radial planes, the length of the outer film is greater than the length of the inner film. This condition will have the tendency to bring the images on the two separate films slightly out of registration at a certain point in their travel around the drum; in other words, if the films are in registration at the start of their travel around the drum, it is evident that they will be slightly out of registration at the point where they are taken off from the drum. The film 25, however, is employed dry, whereas the positive 27 is moistened by immersion in a liquid carried in a tray 28 shown as supported by a front frame element. The effect of moisture upon the film, as is well known, causes an elongation thereof so that therefore the film 27, which would be the same length as the film 25 when dry, will be slightly longer than the film 25 when fed on to the color transfer drum 26 due to its wet condition.

The curvature of the drum is computed in consideration of the greater length of the moistened film 27, so as to provide a perfect registration of the images during the contact of the film. The film 25 is supplied on a reel 29 and is carried over a train of rollers 30 and 31 and sprockets 32 and 33 to a feed sprocket 34, the periphery of which sprocket is geared to travel at the same rate of speed as the periphery of the color transfer drum 26, therefore being driven in what may be termed peripheral synchronism with the drum 26. The film 25 extends around the drum 26 and over a takeoff sprocket 36 from whence it is directed in continuous loops 37 over film drying spools 38. The positive film 27 is delivered to the color transfer machine in moist condition from a previous operation or from a film tank where it is kept in moistening liquid until being fed over a takeup roller 39 to an immersing roller 40, under which the film extends into liquid contained in the moistening tray 28. From the spool 40, the film is conducted over retarding sprockets 41 and delivered to a feed sprocket 42 which also travels in peripheral synchronism with the color transfer drum 26.

The color transfer machine shown in Fig. 1 shows a complete equipment for applying one color. It is customary to mount a number of these machines upon a frame and to conduct the positive film 27 from one machine to the next, applying a separate color thereto in each machine. Therefore, the end 44 of the positive film 27 may be taken either from a film container or from a previous color transfer machine, while the end 45 thereof may be led to a succeeding machine, or to drying racks. Between the separate machines there is always a slack in the positive film. For the purpose of taking up this slack the takeup roller 39 is employed. This roller is mounted upon a carriage 46 which is vertically slidable upon a shaft 47 and is pulled upwardly thereupon by a counter weight 49 secured to a rope or other flexible member 50, which is passed over sheaves 51. In this manner the loop of film 52 constituting the slack between two color transfer machines is kept taut by the engagement of the roller 39.

Figure 2:
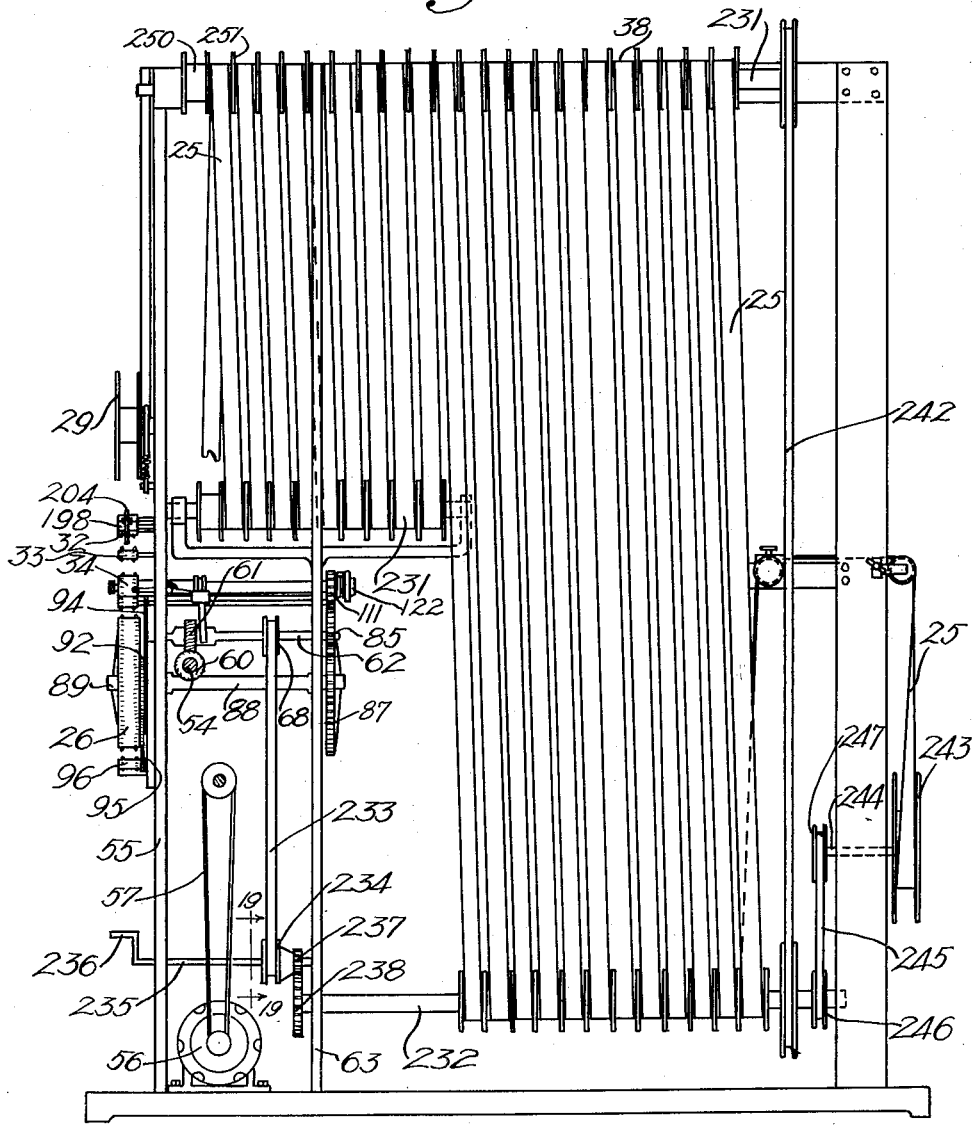
Fig. 2 is a side elevation corresponding to Fig. 1.
Figure 3:
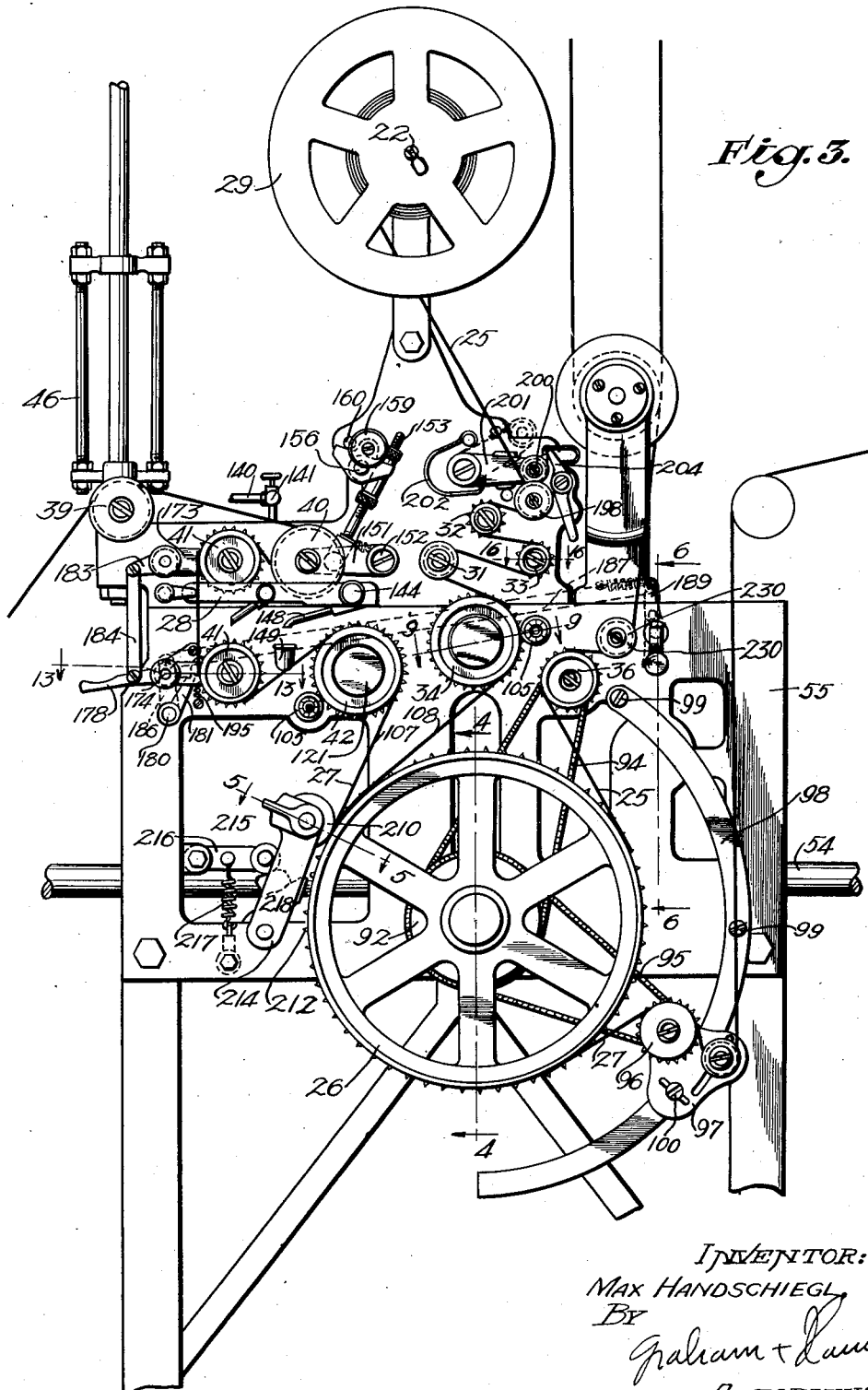
Fig. 3 is an enlarged elevation showing in detail the color transfer drum and mechanism associated therewith.

As shown in Figs. 1, 2 and 3, a drive shaft 54 is extended horizontally behind the face plate or front frame element 55 of the color transfer machine, this shaft being driven by a motor 56 which is connected by a belt 57 with the speed change gear box 58 from which the worm wheel 59 mounted upon the end of the shaft 54 is driven. A worm 60 mounted upon the shaft 54 drives a worm wheel 61 which is turnably mounted upon a shaft 62, supported between the front frame element 55 and the rear frame element 63 of the color transfer machine. Adjacent to the worm wheel 61 is placed a clutch member 64 which is driven by pins 65 extending into holes 66 formed in the gear 61. Rigidly mounted upon the shaft 62 by means of a cotter pin 67 is a pulley member 68, having recesses 69 formed therein which may be engaged by projections or dogs 70 formed on the clutch member 64. When the member 64 is moved rearwardly, as shown in Fig. 7, the dogs 70 drop into the recesses 69, causing the rotation of the shaft 62 upon which the pulley is mounted. The means for causing the engagement of the clutch consists of a shaft 72 which is normally held in a forward position by a spring 73. This shaft has a yoke 74 secured thereupon which engages an annular channel 75 in the clutch member 64. By forcing the shaft inwardly against the action of the spring 73, the yoke 74 moves the clutch member 64 into engagement with the pulley member 68, and at this time a pawl 76 drops into place against a projection 77 formed on the yoke member 74, thus preventing the returning of the shaft 72 into outward position until the release of the pawl 76, which release is accomplished by forcing the lever 78 associated therewith downwardly so that a rotation around the pivot point 79 is obtained which results in the lifting of the pawl 76 from engagement with the projection 77. A spring 80 mounted in a recess in the frame 55 applies pressure through a plug 81 to a portion of the latch member and serves to resiliently force the pawl 76 downwardly so that it will readily drop into engagement position when the shaft 72 is forced inwardly in the direction of the arrow 83.

Upon the rearward end 84 of the shaft 62, a driving pinion 85 is secured by a pin 86. This drive pinion 85 engages a large gear 87 which is mounted upon the shaft 88 which supports at its forward end 89 the color transfer drum 26. As indicated in Fig. 1, the color printing plate takeoff sprocket is driven by a gear 90 which engages the gear 87, thus driving the film takeoff sprocket 36 in synchronism with the drum 26. As shown in Figs. 2 and 4, a sheave 92 is rotatably mounted concentric with the color transfer drum 26, a spring belt 94 driving the sheave 92 from a sheave formed with the takeoff sprocket 36. From the sheave 92 a spring belt 95 is employed to drive the positive film takeoff sprocket 96. It is not possible to extend a belt directly from the takeoff 36 to the takeoff 96, owing to the fact that the takeoff 96 is mounted upon a carriage 97 which slides along a curved guide 98, concentric with the drum 26, but by driving the sheave 92 which is concentric with the slide 98 it is possible to drive the takeoff 96 by means of the belt 95. The guide 98 is so secured to the frame 55 by screws 99 that the carriage 97 may be moved therealong through an arc of substantially 120 degrees, being clamped in various positions by a set screw 100.

It will be recognized that by moving the carriage 97 upwardly from the position in which it is shown in Fig. 3, the arc of contact of the film 27 with the film 25 may be considerably increased. The amount of color transferred depends upon a number of conditions which are: the amount of color carried on the color printing plate; and the pressure applied in the transfer and the length of time which two films are in contact. The pressure between the films generally remains constant so that the transfer of the color may be varied in proportion either by changing the arc of contact, or by changing the rate of speed at which the films are travelling over the drum 26 which may be accomplished by the gear box 58. It will be recognized that when the color printing plate 25 is first removed from the dye bath, a considerable amount of color will be carried thereupon. Therefore when it is first used, the arc of contact between the films may be considerably reduced. When the color printing plate is again used to color another positive, it is necessary to increase the arc of contact owing to the fact that the color printing plate has been relieved of a certain amount of color in printing the previous positive.

The feed sprockets 34 and 42, which are plainly shown in Fig. 3, are driven in synchronism with the drum 26, and knobs 105 are provided therewith for adjusting the alignment of the feed sprockets with the drum 26. It is also possible to adjust the register of the feed sprockets 34 and 42 with the drum so that those portions 107 and 108 of the films 25 and 27 will be maintained with the slack, thus assuring that the films will run onto the drum in correct register. The drive and adjustment mechanism for the feed sprockets 34 and 42 is shown in Figs. 9, 10, 11 and 12; the mechanism for driving the sprocket 34 only being shown owing to the fact that both feed sprockets are driven in the same manner. Upon a quill 110, mounted in the frame member 63, is placed a gear 111, which is driven by the large gear 87 and carries a smaller differential gear 112. Through the quill 110 and through a sleeve 115 a tubular shaft 116 is placed. This shaft 116 carries a sprocket 34 at the forward end thereof and has a differential gear 118 secured at the rear end thereof. A rod 120 is extended through the shaft 116 and is provided with a knob 121 upon its forward end and a fixture 122 upon its rearward end. The fixture 122 supports a small gear 123 which is adapted to engage both differential gears 112 and 118 rotating the shaft 116 when it is pulled forwardly as indicated in Fig. 9 or to permit disengagement by forcing the shaft inwardly as indicated by the arrow 126. When the fixture 122 is moved rearwardly, the gear 123 may be moved out of engagement with the gear 112, as shown in Fig. 11. In a projection 127, formed on the fixture 122, a spring retained pin 128 is placed which engages a depression 129 in the hub 130 of the differential gear 118 when the shaft is pulled forwardly, this engagement of the pin serving to prevent unintended rearward movement of the shaft when the machine is in operation. The gears 112 and 118 are of substantially the same diameter and of the same tooth formation, except that the actual number of teeth therein is varied; in other words the gear 118 may contain one tooth more than the gear 112. By rotating the rod 120 when the gear 123 is in engagement with both differential gears, a retard or advance of one tooth may be caused between the gears 112 and 118 by each revolution of the knob 121, therefore by rotating the knob a microadjustment of the feed sprocket may be obtained. By forcing the knob 121 inwardly, the engagement between the gears 112 and 118 is released and the feed sprocket 34 may then be freely rotated; but by drawing outwardly on the knob 121, the drive engagement is re-established. The release of the sprocket 34 greatly facilitates the threading of the machine with the film, and the ability to quickly adjust the sprocket 34 by means of the differential mechanism further expedites the adjustment off of the machine.

The knobs 105 are formed on the outer end of sleeves 130 which project through the front frame member 55, these sleeves being held in place by enlargements or caps 131, which may be rigidly connected and rotatable therewith having the forward ends thereof interiorly threaded as indicated at 132. A rod 134 extends through the sleeve 130 and is slidable therethrough. Upon the rod 134 a yoke member 135 having a hub formation 136, shown as secured to said rod by a pin 137, threads into the cap 131, as shown in Fig. 9, so that when the knob is rotated in one direction or the other the hub 136 will be caused to advance inwardly or outwardly in the cap 132, thus making it possible by rotating the knob 105 to move the shaft 116 carrying a grooved collar 138, engageable by the yoke member 135 in a horizontal direction, so that the position of the drive sprocket relative to the color transfer drum may be adjusted.

The moistening tray 28 is shown as supported from the front frame element 55 and is fed with moistening liquid from a pipe 140 and a spigot 141 shown in Fig. 3. An overflow is provided for controlling the level of the liquid 142, Fig. 14, in the tray 28 in the form of a rotatable shaft 143, having a knob 144, Fig. 3, mounted on the forward end thereof in order that the member 143 may be rotated so as to move the overflow opening 145 from the vertical position shown in Fig. 14 to an angular position such as indicated by the line 146, thus changing the effective level of the overflow opening. The overflow opening is connected through a passage 147 with a spout 148, Fig. 3, which delivers the overflow into a cup 149. The immersing spool 40 is mounted on an arm 151, pivoted at 152 and means for lifting the spool 40 into the position shown in Fig. 15 is provided in the form of a threaded shaft 153, having a bracket 154, adjustably mounted thereupon by nuts 155. The bracket 154 is engaged by a pin 156 supporting a bi-laterally extending member 157 which may be rotated upon the said pin as a pivot, by means such as a knob 159. By means such as the knob 159, the member 157 may be rotated from the position shown in Fig. 3, the member 157 engaging against the stop pin 160, to the raising position shown in Fig. 15, thus causing the arm 151 to swing upwardly with the result that the spool 40 is lifted from the tray 28. This expedient is provided for the purpose of expediting and placing the film on the spool 40, from which spool the film is continued over the retarding sprockets 41. These sprockets 41 are frictionally retarded so that the film will be held taut as it travels over the feed sprocket 42 but may be released and allowed to freely rotate during the placing of the film thereof. Each of the sprockets 41 as shown in Fig. 13 is mounted on an outwardly extending stud 170 and is engaged by a yoke 171 resting in the annular channel 172 by a member 173 mounted upon an adjacent stud 174. A spring 175 transmits a resilient pressure to the member 173 and the yoke 171, which pressure holds the spool 42 against a friction plate 176, thus preventing the free rotation of the sprocket 41. Between the members 173 and the frame member 55 in which the stud 174 is mounted, a member 177 is mounted, this member having an outwardly extending lower arm 178 by which it may be downwardly rotated. It will be noticed that the outer face 179 of the member 177 is inclined so that by forcing the member 178 downwardly, the member 173 may be forced outwardly against the action of the spring 175 with the result that the pressure against the friction plate 176 is removed and the sprocket 42 allowed free rotation. Upon a shaft 180 situated below the stud 174, a latch 181 is mounted, which latch is adapted to engage the rearward extension 182 of the member 177 so that the handle 178 may be retained in downwardly rotated position until the film has been placed over the sprockets 41 and 42 and it is again desired to frictionally retard the sprockets. The member 173 which co-operates with the sprocket 41 has a short arm 183 extending rearwardly therefrom which is linked to the lever 178 by a member 184.

Mechanism is provided for the purpose of automatically releasing the members 177 whenever the clutch mechanism for driving the color transfer machine is thrown into engagement. As indicated in dotted lines in Fig. 3, the shaft 180 has a lever 186 upwardly extended therefrom, from which lever a link 187 extends to a crank member 189, mounted in a position adjacent to the clutch operating shaft 72, Fig. 6. As shown in Fig. 8 the rearward end of the shaft 72 is beveled off as indicated at 190 and a pin 191 mounted in the lower extension 192 of the member 189, so that when the shaft 72 is forced inwardly the pin 191 rides outwardly upon the portion 190, causing the upper end 193 of the member 189 to swing in a right hand direction, which swing is transferred through the link 187 to the lever 186 causing the latch 181 mounted upon the forward end of the shaft 180 to disengage the member 173 with the result that the lever 178 may rotate upwardly under the action of the spring 195, which rotation of the lever 178 is accompanied by the rotation of the member 177, which permits the member to move inwardly under the action of the spring 175.

Referring to Fig. 3, the color printing plate 25 is directed over a freely rotating spool 198 to the retarded sprockets 32 and 33. For the purpose of holding the film in engagement with the spool 198, a guard spool 200 is supported upon an upwardly swingable arm 201, which is swung upwardly under the action of a spring 202, and may be latched down against the film 25 as it runs over a pulley 198 by means of a latch member 204. The construction of the retarded sprockets 32 and 33 is substantially as shown in Fig. 16. Owing to the fact that the sprockets 32 and 33 are of identical construction, the sprocket 33 only is shown. A stud 205 is extended outwardly from the frame 55 and the sprocket 33 is placed thereupon and is held against a friction plate 206, of fibre or other suitable material, by a spring 207 which is compressed against the sprocket 33 by a collar 208 pinned upon the shaft 205 by a cotter pin 209. The friction of the sprocket 33 against the friction plate 206 prevents the free rotation of the sprocket 32 and 33, so that the film is held without slack as it passes over the idler pulley 31 to the feed sprocket 34.

A squeegee roller 210 as shown in Figs. 3 and 5 is provided for the purpose of squeezing the films tightly together as they are fed upon the color transfer drum 26. This roller as shown in Fig. 5 has grooves 211 cut near the edges thereof so as to clear the teeth 212 formed upon the drum 26. The roller is mounted upon a lever 214 which is held in engagement position or retracted position by a roller 215 mounted upon an arm 216 which is held resiliently downwardly by a spring 217, this roller 215 engaging a cam 218 formed integrally with the lever 214. This cam 218 provides a sloping surface for the engagement of the roller 215 in a manner to force the squeegee roller 210 against the drum 26, and the cam also provides a notch into which the roller will drop when the arm 214 is swung outwardly to bring the roller 210 out of engagement with the drum 26.

Figure 19:
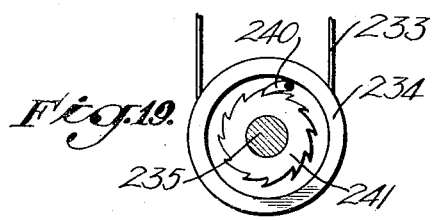
Fig. 19 is an enlarged section taken as indicated by the line 19—19 of Fig. 2.

Fig. 18 is a rear view of the film reel 29 shown in Fig. 3, this Fig. 18 being provided for the purpose of showing the simple form of retarding means employed as a brake for preventing free rotation of the reel 29. A sheave 220 is mounted upon the shaft 221 in such a manner that it is rotatable with the reel 29, a loop of rope or other fibrous material 222 is placed over the sheave 220 and a tension spring 223 engaged therein for the purpose of exerting a tension upon the loop 222 which will cause it to pressurably engage the sheave and thus prevent the free turning thereof. The film 25, as hereinbefore mentioned, upon leaving the take-off sprocket 36 is carried over an idler 230 to the drying spools which as shown in Fig. 2 are mounted upon shafts 231 and 232. The shaft 232 is driven by a belt 233 from the pulley 68 mounted upon the shaft 62. The belt 233 drives a pulley 234 mounted upon a shaft 235 having a crank 236 at the forward end thereof and a pinion 237 at the rearward end thereof which engages a gear 238 mounted upon the shaft 232. A pulley 234 has a pawl 240 mounted thereupon, as shown in Fig. 19, this pawl engaging a ratchet 241 rigidly mounted upon the shaft 235 so that the rotation of the pulley 234 is transferred to the shaft 235 upon which the pinion 237 is mounted, thus causing the driving of the shaft 232, the rotation of which shaft is transferred to the upper shaft 231 by a belt 242. The crank is provided for the purpose of operating the shaft 232 independently of the color transfer machine in order that the film 25 may be wound from the spools 38 onto a reel 243 after the film has been dried. The reel 243 is mounted upon a shaft 244 which is driven by a belt 245 extending over a pulley 246 mounted upon the shaft 232 and over a pulley 247 mounted upon the shaft 244. The belt 245 is so constituted that it will slide upon the pulleys when a certain predetermined resistance is exerted by the film 25.

The spools 38 as shown in Fig. 17 consist of wood spacers 250 which are somewhat loosely mounted upon the shaft 231 and 232, and dividing discs 251 which separate the loops of film 25. It will be recognized that the spools 38 are separately rotatable relative to the shafts upon which they are mounted and thus provide means for serving an equal tension in all the loops of film upon the dryer.

It is desired to direct especial attention to the feature of the invention which consists of directing the film strips 25 and 27 over the synchronously rotated feed sprockets 34 and 42. By this arrangement the films are relieved of tension before being brought together on the drum 26, thus assuring perfect registration of the images thereof; and applicant's use of means such as the exposed handles 105, 121, 159 and the lever 178, for the respective purposes indicated above, are found to be highly advantageous in simplifying the control of the entire organization described.

I claim as my invention:

1. In a color transfer machine, the combination of: a rotatable drum having film engagement teeth arranged thereupon; separate feed sprockets for feeding to said drum separate superimposed films unequally expanded; adjustable means comprising a roller on a pivoted arm for predetermining the extent of a softening and expanding treatment of the outermost of said films; and means provided with registry adjustments for driving said feed sprockets in synchronism with said drum.

2. In a color transfer machine, the combination of: a rotatable drum having film engagement teeth arranged thereupon; separate feed sprockets for feeding to said drum separate superimposed films unequally expanded; means provided with registry adjustments for driving said feed sprockets in synchronism with said drum; and film moistening means comprising a tray arranged to moisten a film strip before it is carried over said drum; a roller movable relatively to said tray, and means comprising a threaded rod pivoted to a support for said roller for varying the immersion thereof.

3. In a color transfer machine, the combination of: a rotatable drum having film engagement teeth arranged thereupon; separate feed sprockets for feeding to said drum separate superimposed films unequally expanded; means provided with registry adjustments for driving said feed sprockets in synchronism with said drum; and film moistening means arranged to moisten a film strip before it is carried over said drum, said means comprising a tray holding a body of liquid into which a loop of film may be carried, and a roller supported on a pivoted arm, to vary the depth to which said loop is carried.

4. In a color transfer machine, the combination of: a rotatable drum having film engagement teeth arranged thereupon; separate feed sprockets for feeding to said drum separate superimposed films unequally expanded; means provided with registry adjustments for driving said feed sprockets in synchronism with said drum; film moistening means arranged to moisten a film strip occupying an exterior position, to elongate the same before it is carried over said drum, said means comprising a tray holding a body of liquid into which a loop of film may be carried; and means comprising a roller on an arm to which is pivoted a threaded rod for varying the moistening effected by said liquid.

5. In a color transfer machine, the combination of a rotatable drum having film engagement teeth arranged thereupon; separate feed sprockets for feeding separate lengths of film to said drum; means for driving said feed sprockets in synchronism with said drum; film moistening means arranged to moisten an outer film strip before it is carried over said drum, said means comprising a tray holding a body of liquid into which a loop of said outer film may be carried; means for varying the extension of said loop in said liquid; means for varying the level of a liquid continuously fed to and overflowing from said tray; and trains of roller members over which said lengths of film are directed to said feed sprockets, certain of said roller members being provided with retarding means for holding said films taut.

6. In a color transfer machine, the combination of: a rotatable drum having film engagement teeth arranged thereupon; separate feed sprockets arranged at one side of said drum for feeding lengths of film to said drum; means for aligning and for driving said feed sprockets in synchronism with said drum; film takeoff sprockets arranged substantially opposite said feed sprockets, said takeoff sprockets being also driven in synchronism with said drum and one of said take-off sprockets being movable on an arcuate guide concentric with said drum; film moistening means arranged to moisten a film strip before it is carried over said drum, said means comprising a tray holding a body of liquid into which a loop of film may be carried; means comprising a roller so supported as to permit the lateral shifting of said loop thereover and comprising also means for varying the level of overflow from said tray for varying the extension of said loop in said liquid; and trains of roller members over which said lengths of film are directed to said feed sprockets, certain of said roller members being provided with retarding means for holding said films taut.

7. In a color transfer machine, the combination of: a frame comprising a front frame element; a rotatable drum having film engagement teeth arranged thereupon; a feed sprocket arranged to feed an inner length of film to said drum; a feed sprocket arranged to feed an outer length of film to said drum, in superimposed position upon said inner length of film; means provided with micro-adjustment of registry for driving said feed sprockets in synchronism with said drum; a takeoff sprocket for said inner length of film; a takeoff sprocket for said outer length of film; means permitting arcuate adjustment of said last named takeoff sprocket so as to change the point at which said outer length of film is removed from contact with said inner length of film; and adjustable film moistening means arranged to moisten a film strip before it is carried over said drum; said drum, said sprocket and said moistening means being all supported in substantially the same vertical plane by said front frame element.

8. In a color transfer machine, the combination of: a rotatable drum having film engagement teeth arranged thereupon; a feed sprocket arranged to feed an inner length of film to said drum; a feed sprocket arranged to feed an outer length of film to said drum, in superimposed position upon said inner length of film; adjustable means for driving said feed sprockets in synchronism with said drum; a takeoff sprocket for said inner length of film; a takeoff sprocket for said outer length of film; means permitting arcuate adjustment of said last named takeoff sprocket so as to change the point at which said outer length of film is removed from contact with said inner length of film; film moistening means arranged to moisten the outer film strip before it is carried over said drum, said means comprising a tray holding a body of liquid into which a loop of film may be carried; and means for varying the extension of said loop in said liquid, said last mentioned means comprising a pivoted arm supporting a roller at one side thereof and connected at an intermediate point to an adjustable shifting means.

9. In a color transfer machine, the combination of: a rotatable drum having film engagement teeth arranged thereupon; a feed sprocket arranged to feed an inner length of film to said drum; a feed sprocket arranged to feed an outer length of film to said drum, in superimposed position upon said inner length of film; adjustable means for driving said feed sprockets in synchronism with said drum; a takeoff sprocket for said inner length of film; a takeoff sprocket for said outer length of film; means permitting arcuate adjustment of said last named takeoff sprocket so as to change the point at which said outer length of film is removed from contact with said inner length of film; film moistening means arranged to moisten a film strip before it is carried over said drum, said means comprising a tray provided with an adjustable outlet and holding a body of liquid into which a loop of film may be carried; pivoted means for varying the extension of said loop in said liquid; and trains of roller members over which said lengths of film are directed to said feed sprockets, certain of said roller members being provided with retarding means for holding said films taut.

10. In a color transfer machine, the combination of: a rotatable drum having film engagement teeth arranged thereupon; a feed sprocket arranged to feed an inner length of film to said drum; a feed sprocket arranged to feed an outer length of film to said drum, in superimposed position upon said inner length of film; adjustable means for driving said feed sprockets in synchronism with said drum; a takeoff sprocket for said inner length of film; a takeoff sprocket for said outer length of film; means for driving said takeoff sprockets synchronously with said drum; means permitting arcuate adjustment of said last named takeoff sprocket so as to change the point at which said outer length of film is removed from contact with said inner length of film; film moistening means arranged to moisten a film strip before it is carried over said drum, said means comprising a tray holding a body of liquid into which a loop of film may be carried; means comprising a pivoted arm for varying the extension of said loop in said liquid; and trains of roller members over which said lengths of film are directed to said feed sprockets, certain of said roller members being provided with retarding means for holding said films taut.

11. In a color transfer machine, the combination of: a color transfer drum; mechanism for driving said drum; separately adjustable sprockets over which separate films are respectively carried to said drum; releasable friction retarding means for said sprockets; and means rendering said retarding means operative when said drive mechanism is actuated.

12. In means for adjustment of the alignment of sprockets, the combination of: a sleeve member rigidly connected with a part having threads formed thereon; means for rotating said sleeve; a shaft extending through said sleeve; and an engagement member secured on said shaft, said engagement member having a threaded portion engaged by the threads of said threaded part.

13. In a color transfer machine comprising a transfer drum, exposed handles and film sprockets: means whereby the manipulation of one of said exposed handles is effective to impart movements of alignment to a film sprocket, said means comprising a rod on which said handle is adapted to rotate, a shaft carrying said sprocket, and means whereby the rotation of said handle is effective to impart longitudinal movement to said shaft.

14. In a color transfer machine: means for advancing a plurality of films; an exposed handle; means whereby manipulation of said exposed handle is effective to change the relative rate of advance of one of said plurality of films, to effect the mentioned registry adjustments, said means comprising a tubular shaft carrying said sprocket and extending through a quill carrying a gear; a drive gear engaging a gear to which the gear on said quill is secured; a rod extending from said handle through said tubular shaft; a gear secured to said shaft and disposed in proximity to the gear on said quill but differing therefrom in the number of its teeth; and a smaller gear movable by said rod and adapted, when said rod is advanced, to engage both of said gears differing in the number of their teeth,—so that rotation of said gear is then effective to advance or retard the rotation of said tubular shaft and the sprocket carried thereby.

15. In a color transfer machine comprising a drum and means for moistening a film to which color is to be transferred from another film during its passage over said drum; an exposed handle and means whereby the manipulation of said exposed handle is effective to vary the mentioned moistening effect, said means comprising a roller on a pivoted arm and means whereby the rotation of said handle is effective to vary the elevation of said arm.

16. In a color transfer machine comprising a transfer drum, film-handling sprockets, a drive clutch, a drive for said transfer drum controllable by said clutch, means for rotating said film handling sprockets in synchronism with said drum; means for applying frictional pressure to some of said sprockets and means whereby a manipulation of said clutch automatically shifts said friction-applying means.

17. An organization of the general character defined in claim 13 in which said shaft is a hollow shaft rotatable by a drive gear and through which extends an additional rod, provided at one end with a handle and at its opposite end with means for varying the rate of rotation of said shaft relatively to said drive gear.

18. In an organization of the general character described: a film sprocket mounted on a tubular shaft through which extends a rod carrying a handle; means for rotating said tubular shaft; means whereby a longitudinal movement of said rod is effective to disengage said rotating means; and means whereby a rotation of said rod is effective slightly to advance or retard the rotation of said tubular shaft relatively to said rotating means.

In testimony whereof, I have hereunto set my hand at Los Angeles, California, this 12th day of June, 1923.

MAX HANDSCHIEGL.